Figure 1:
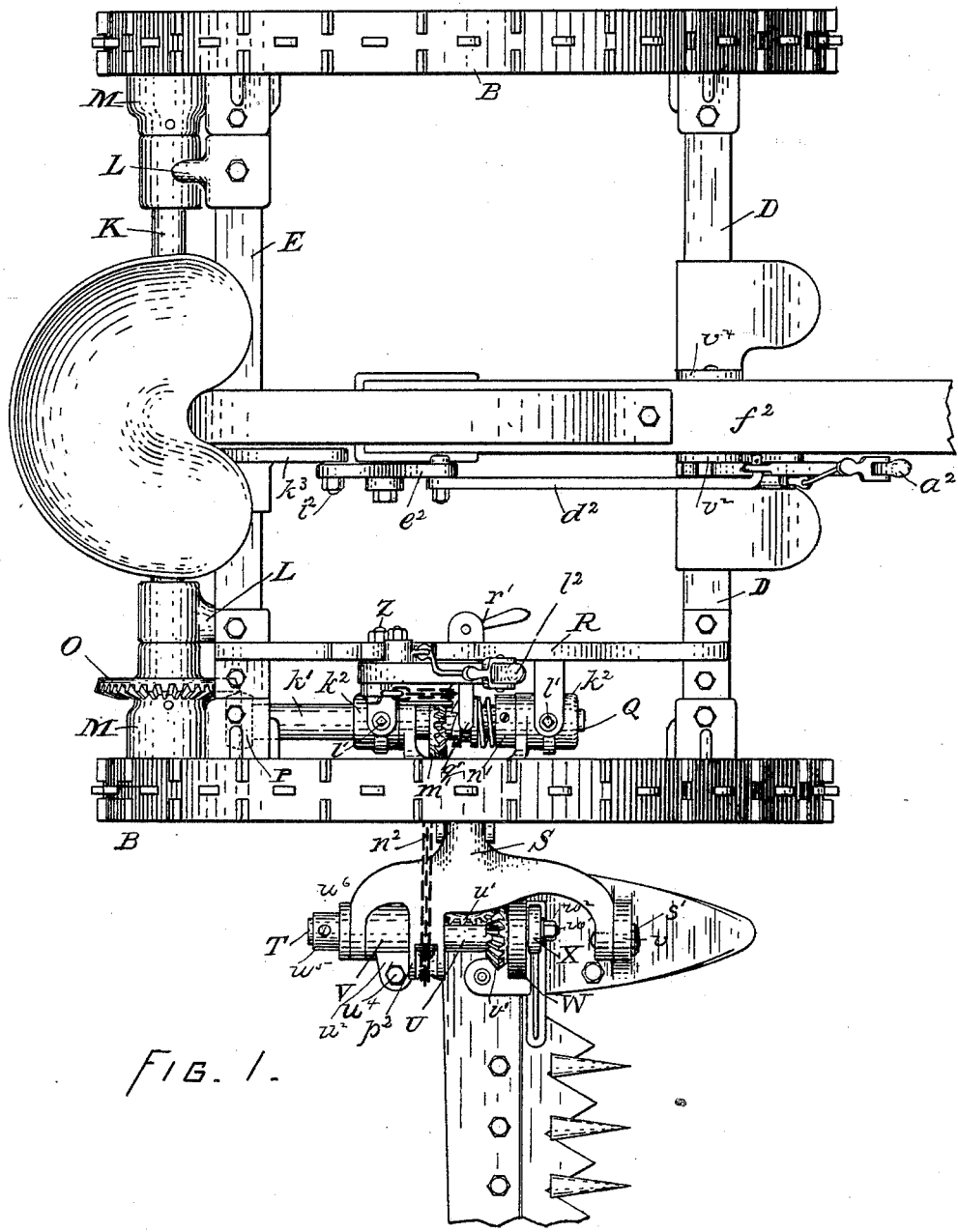

(No Model.) 4 Sheets—Sheet 1.

F. S., J. T., T. & A. JACKSON
MOWING MACHINE.

No. 491,736. Patented Feb. 14, 1893.

Witnesses,
A. A. Charbonneau
J. B. Lamb

Inventors:
Frank S. Jackson, Jno. T. Jackson
Thomas Jackson & Alfred Jackson
By J. Coursolle Atty

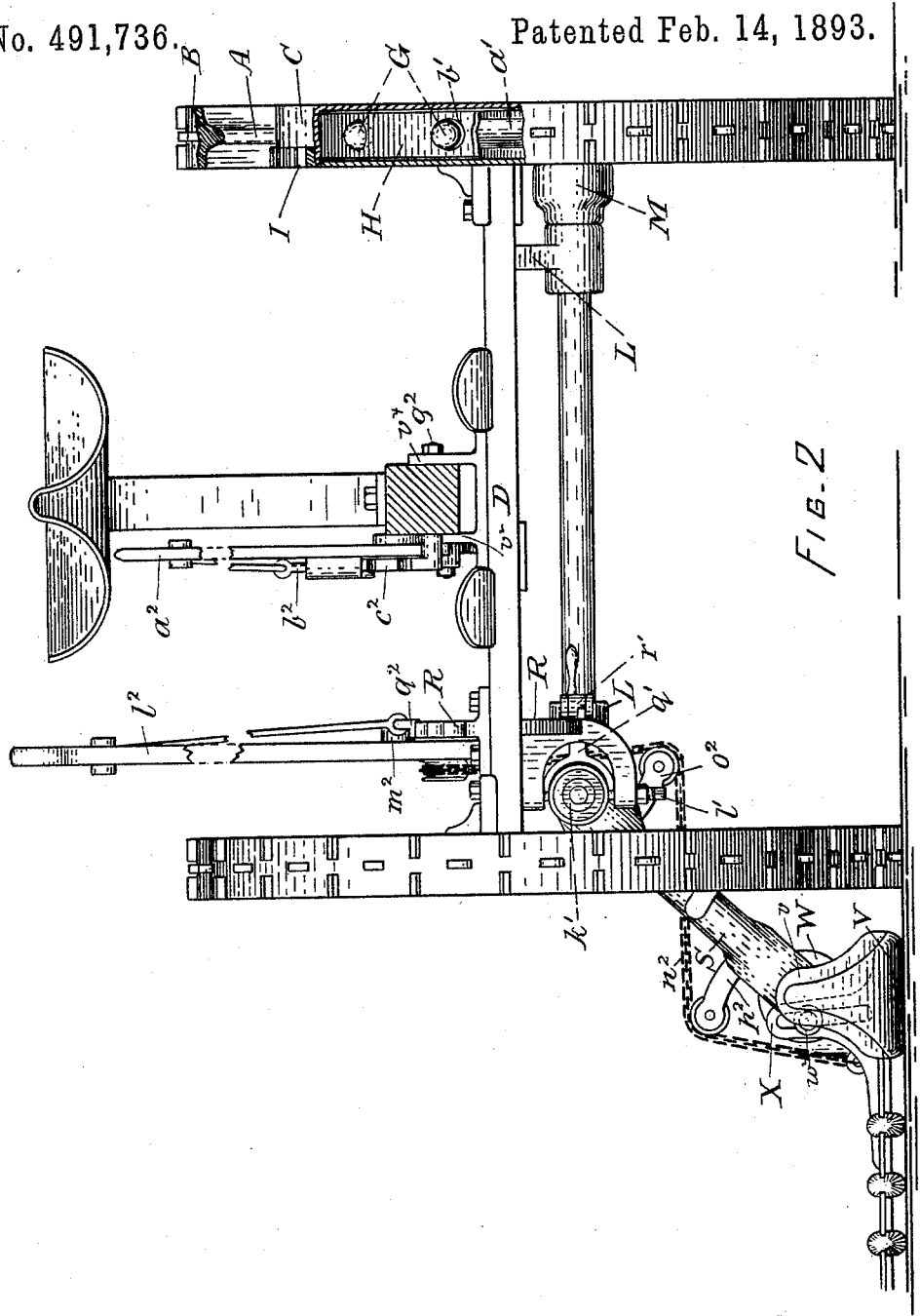

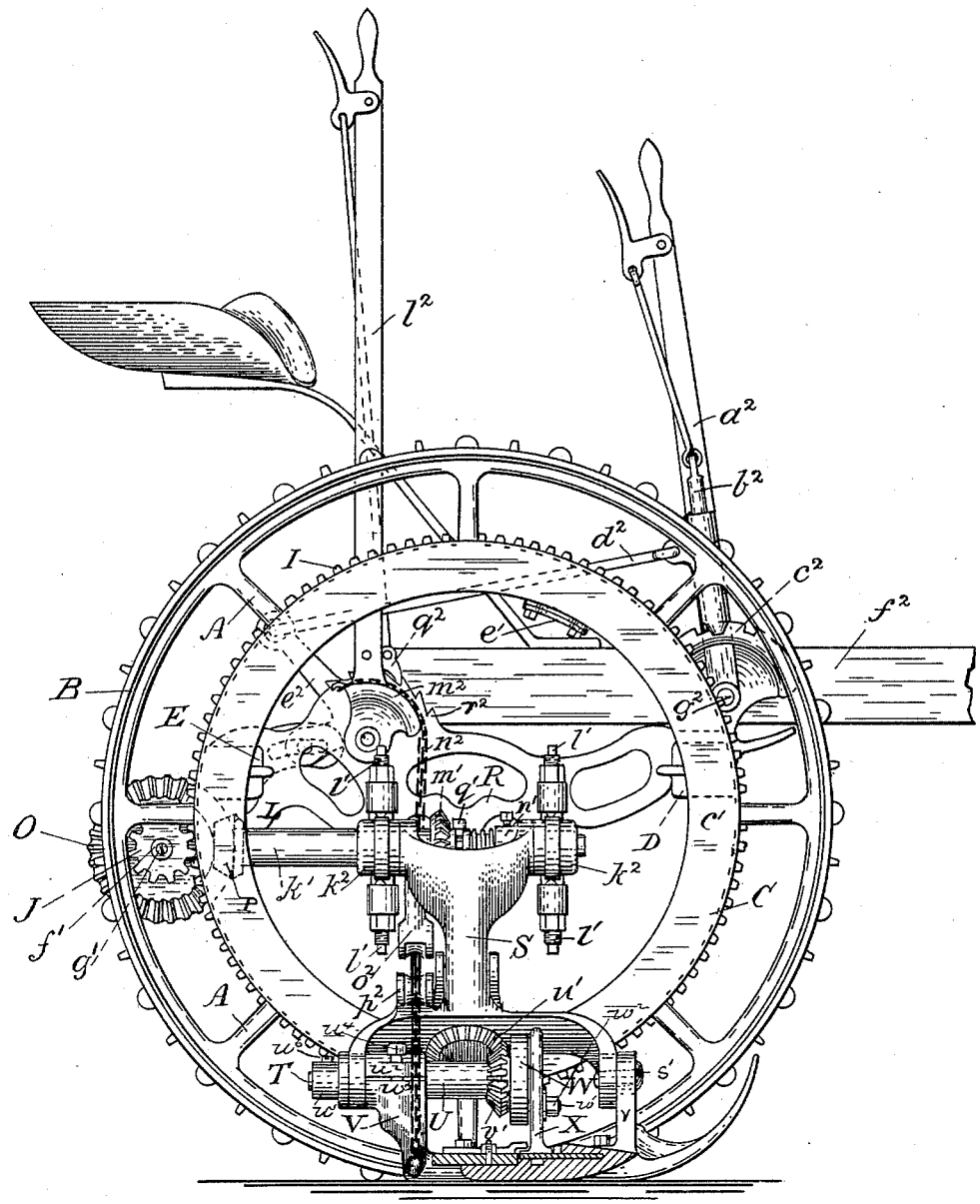

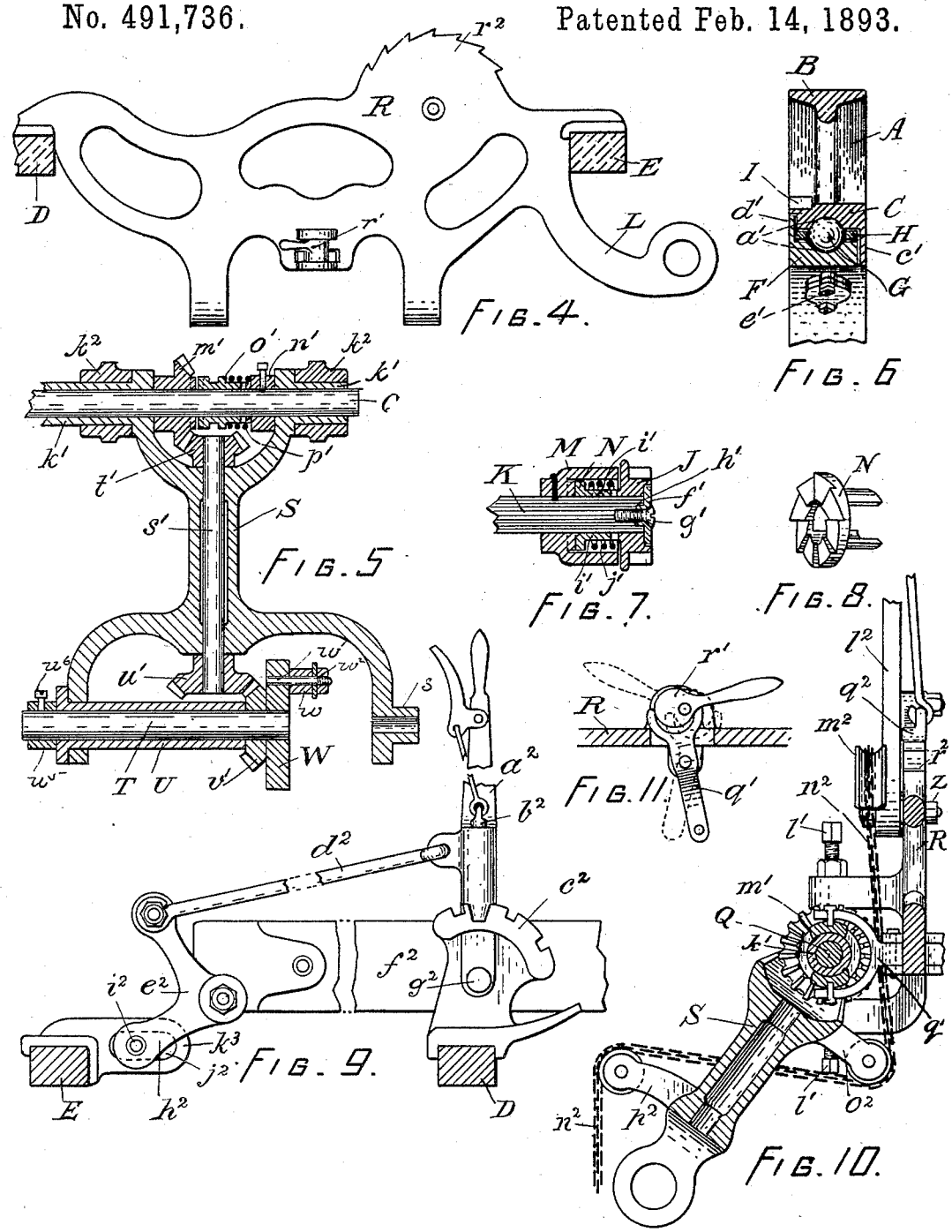

UNITED STATES PATENT OFFICE.

FRANK SMITH JACKSON, JOHN THOMAS JACKSON, THOMAS JACKSON, AND ALFRED JACKSON, OF TORONTO, CANADA.

MOWING-MACHINE.

SPECIFICATION forming part of Letters Patent No. 491,736, dated February 14, 1893.

Application filed May 19, 1888. Serial No. 274,427. (No model.) Patented in Canada November 29, 1888, No. 30,300.

*To all whom it may concern:*

Be it known that we, FRANK SMITH JACKSON, JOHN THOMAS JACKSON, THOMAS JACKSON, and ALFRED JACKSON, machinists, all of the city of Toronto, in the county of York, in the Province of Ontario, in the Dominion of Canada, have invented certain new and useful Improvements in Mowing-Machines, (for which Canadian Letters Patent No. 30,300 were granted to us on the 29th day of November, 1888;) and we do hereby declare that the following is a full, clear, and exact description of the same.

Our invention relates to improvements in that class of mowing machines in which the connection of the carrying wheels with the frame of the machine is made by an inner felly or cylindrical band, attached by short spokes to the outer rim or felly of the wheel, said inner rim being fitted to work around a ring forming a part of the frame of the machine, and which rides upon a number of balls which roll in grooves formed to receive them on the outer surface of said ring, and on the inner surface of the inner felly, or rim, of the carrying wheels.

The objects sought for in our improvements are as follows, namely:—First,—to provide a machine of light draft, simple construction, and having its cutting apparatus approximately in line with the points of contact of the carrying wheels with the ground; second, to provide simple and easy means for both tilting the cutting edge of the cutter bar, up or down, and for raising the cutting apparatus without checking its motion when passing over obstacles; and, third, to provide against injurious strain on the shafts and gears of the machine. We attain these objects by means of the new features in the mechanism of a mowing machine, which are hereinafter described and illustrated in the accompanying drawings, in which—

Figure 1 is a plan view, Fig. 2, a front view, and Fig. 3, a side view of a mower containing our improvements. Fig. 4 is an inner side view of the skeleton frame. Fig. 5 is a longitudinal section through the radial shaft tube and shaft, showing also center shaft, gears and couplings. Fig. 6 is a part sectional view of the carrying wheels. Fig. 7, a sectional view of clutch couplings on counter shaft. Fig. 8, a perspective view of the rose-clutch. Fig. 9 shows the tilting mechanism. Fig. 10, the knife raising device. Fig. 11, the knife starting and stopping levers.

Similar letters of reference in the several figures refer to the same parts.

We shall first proceed to describe the peculiar features of our open center carrying wheels, which, with their attached gear rims, give motion to the cutting mechanism.

The spokes A, extend only from the felly, or peripheral rim B of the wheel, to the inner rim or cylindrical band C, and are preferably cast integral with those parts. The frame of the machine, by which working parts are supported, consists substantially of the front bar D and rear bar E, with the cylindrical bands F, to which the ends of said bars are strongly attached.

When the wheels are set up, the band C surrrounds and revolves around the band F rolling upon a series of balls, G, which travel in grooves $a'$ formed in the inner surface of the band C and outer surface of the band F. The inner diameter of the former band is sufficiently greater than the outside diameter of the latter, to allow the interposed pitch band H to lie loosely between them. This pitch band is for the purpose of preventing the balls G from coming together, and thus causing friction; and to this end it has perforations $b'$ made in it at regular intervals, and in these perforations the balls roll freely in the grooves of the bands C and F.

As a means for preventing the entrance of dust or other matter to the grooves and balls, a flange, $c'$, is formed on the outer edge of the band C, extending inward toward the center of the wheel, and a flange, $d'$, on the inner edge of the band F, extending outward from the center of the wheel; which forms, altogether a comparatively close compartment. The balls are inserted through an opening in the band C, the wheels being revolved, which action will present the recesses in the packing rings successively opposite the opening in the band C. This opening is closed up by the plug cap $e'$. From the foregoing description, it will be seen that the interior rings, with their connecting beams form a rigid frame, which is movably sustained within the wheels B, and movable therein on a horizontal axis in line with the axis of the said wheels. This rigid frame is sustained in position and prevented from moving laterally with relation to the ground wheels, by means of the grooves in the two rings and the balls seated in said grooves, which act as a locking medium. A circular gear rack I is rigidly secured to each of the wheel bands C. These gear racks mesh into and drive the pinions J J, which are carried by the shaft K. This shaft is supported by hangers L, which are firmly secured to the rear bar E of the frame. One of these hangers is simply an extension of the skeleton frame. These pinions are provided with clutch mechanism by which the shaft is held to move with them when the machine is moving forward; but which will allow the shaft to lie idle when the pinions are reversed. The pinion J is held from slipping off the end of the shaft by the washer $f'$ and bolt $g'$. This washer is prevented from turning with the pinion by the projection $h'$ cast on its inner face and fitting into a corresponding recess formed in the end of the shaft.

The box hub M is rigidly fixed by pin, or otherwise, to the shaft K. The inner end of the chamber of this hub is made serrated in shape, or which is commonly known as "rose-clutch." A similar clutch face is made on a disk, N, which has on its opposite side two clutch wings $i'$ $i'$, which project along the shaft and engage between them two similar wings formed on the pinion J. These wings, while being continually interlocked, and always move together, slide freely between each other lengthwise of the shaft. A spring, $j'$, holds the rose-clutch faces of the hub M and disk N in normal engagement, but owing to the slope of the clutch teeth, any relative backward motion of the pinion will move the disk back out of the engagement, and thus allow either or both of the pinions, on the shaft K, to turn backward without moving the shaft thereby.

Motion is imparted from the shaft K to the cutting apparatus, or cutter, by means of the following gears and shafting:—A bevel gear wheel O is keyed, or otherwise fixed to the shaft K. This wheel drives a pinion, P, fixed on one end of a shaft, Q, which latter turns in the tubular bearings $k'$ in the arms of the radial shaft tube S, adjustably held by center screws $l'$ in arms projecting out from the skeleton frame R, which is bolted to the front and rear bars D and E. The bearings $k'$, which are made as long as the space will admit, so as to take any bending strain that would otherwise come upon the shaft itself, are cast integral with the limbs of the forked end of the radial shaft tube S. A gear wheel, $m'$, when not clutched thereto, turns freely on the shaft Q. A collar, $n'$, is firmly secured by setscrews, or otherwise, on this shaft, and has projecting from it along the shaft two or more wings, between which the similar wings of a sliding collar O' slide easily endwise, but with which they are kept in constant engagement. The opposite side of the slip collar has a rose-clutch face to correspond and engage with a similar face on the wheel $m'$. A spring, $p'$, holds this rose-clutch in normal engagement, but will yield to the backward movement of the collar when disengagement of the clutch is necessary. This movement of the clutch is accomplished by means of the double forked lever $q'$, and the handled eccentric, $r'$, both of which are pivoted in lugs on the skeleton frame R. The points of one of the forks of the lever $q'$ take into a groove in the sliding collar O', while the fork prongs on the other end of the lever span the handled eccentric $r'$. (See Fig. 11.)

A shaft, S', journaled in the radial shaft tube S has the pinion $t'$ fixed on its inner end, to gear with the wheel $m'$, and on its outer end the gear $u'$, which engages with a bevel pinion $v'$ on the crank-shaft T. This latter shaft runs in a tubular bearing or sleeve, U, which is passed through the perforated split head of the heel of the shoe, of the finger bar, and clamped therein by means of a set-screw $u^4$, passing through ears $u^2$ and $u^3$ formed on said head. This sleeve U, passes loosely through the rear lower arm of the radial shaft tube, and the shoe to which it is clamped extends forward, where it is provided with an arm $r$, which latter is perforated to receive a tubular journal $s$ projecting laterally from the lower forward arm of the radial shaft tube. A bolt $s'$ passes through the tubular journal and the arm $r$, and holds the parts together, permitting them however to turn relatively on a horizontal axis. The shaft T is provided in rear of and beyond the sleeve U, with a collar $u^5$ secured thereto by a set screw $u^6$. This collar prevents the shaft from moving forward endwise. At its forward end the shaft is provided with a crank disk W, having the roller $w$, mounted on a laterally projecting pin $w'$, and held thereon by a nut $w^2$ or by other suitable means. This roller is adapted to enter a slot formed in a vertical arm X, rigidly attached to the cutter bar. In this way the cutter bar receives its reciprocating motion directly from the crank disk, the roller thereon moving in the slot and actuating the cutter bar as the disk revolves.

The points of the cutter of the machine may be raised or lowered by moving the lever $a^2$, which is pivoted to the front part of the machine, substantially as shown in Fig. 9. A spring bolt $b^2$ drops into notches in an arched rim $c^2$, and holds the lever in any desired position. A rod, $d^2$, connects this lever with one arm of the bell crank $e^2$, which is pivoted at its angle to the end of the draft pole $f^2$. This draft pole is pivoted to upright lugs or plates secured to the front bar D of the machine, by the pin, $g^2$, which also serves as fulcrum to the lever $a^2$. The other arm, $h^2$, of the bell crank is connected with the rear part of the machine frame by its pin, $i^2$, which extends from it through a slot, $j^2$, in a bracket, $k^3$, which is fixed to the rear bar E of the machine.

The operation of raising and lowering the points of the cutter bar, is as follows: When the lever $a^2$ is pulled to the rear the bell crank $p^2$ will rock on its pivot and its lower arm will be depressed. This action of the bell crank lever, through its connection with the rigid frame, will turn the latter bodily on a horizontal axis, thereby throwing forward and upward the cutting mechanism, which is sustained by the frame. As the frame is turned, the bolt $g^2$, on which the tongue is pivoted, between the ears $v^2$ and $v^4$ on the front beam D, will be elevated, and the rear end of the tongue carried upward with it, its front end being held down through its connection with the draft animals. As the rear end of the tongue is elevated, the rear edge of the frame is depressed and the pin $i^2$ on the arm of the bell crank lever will slide forward in the slot $j^2$ in the bracket $k^3$, this action permitting the separation of the rear end of the tongue and the rear edge of the frame, due to their relative movements. It will thus be seen that the position of the forward end of the tongue remains unchanged as the parts of the cutter bar are raised.

The outer end of the cutting apparatus is raised for passing over obstacles by means of a lever $l^2$, pivoted at $z$ to the skeleton frame. On this lever is formed a grooved arc $m^2$, in which a chain, $n^2$, lies; from this the chain passes down under a pulley in the lower end of the arm $o^2$ formed on and extending downward from the inner end of the radial shaft tube S. From this point the chain passes over the end of the upright arm $p^2$, on the shaft tube, and thence down to the shoe V, to which it is firmly attached. When the lever $l^2$ is thrown backward the chain is drawn up and the outer end of the cutting apparatus is consequently raised. A spring pawl, $q^2$, takes into notches, $r^2$, in the top edge of the skeleton frame, and the machine knife may thereby be held at any desired angle of elevation or depression.

From the above description it will be readily understood that, as the axes of the shaft Q, the radial shaft $s'$, which swings from it, and the crank shaft T, are all in the same plane; the cutter bar will work equally well in whatever position it may be directed.

What we claim as our invention in the above described machine, is—

1. In a mowing machine, the supporting ground wheels each having the inner rigid circular bearing surface and the open center in combination with the relatively movable rings sustained by said bearing surfaces, the front and rear transverse beams, rigidly connected to the said bearing rings, the frame R, connected at its ends respectively to the said beams, the radial shaft tube connected to the said frame R and extending therefrom outward and downward through the ground wheel, the cutting mechanism at the lower end of the shaft tube, and suitable connections between the ground wheels and the cutting mechanism for imparting motion to the latter, substantially as described.

2. The combination of the ground wheels having the circular racks, the frame sustained by said ground wheels, the transverse driving shaft and its pinion mounted on the frame, and arranged to be driven by the ground wheels, the bevel pinion O on said shaft, the shaft Q, also mounted on the frame at right angles to the driving shaft, the pinion thereon in position to be engaged by the pinion O and the pinion $m'$ also on said shaft, the radial shaft tube sustained by the shaft Q, and extending downward and outward therefrom, the longitudinal shaft $S'$ journaled therein, the pinion $t'$ on its upper end in position to be engaged by the pinion $m'$, and the pinion $u'$ on its lower end, the transverse shaft T journaled in the lower end of the shaft tube, the pinion $i'$ thereon in position to be engaged by the pinion $u'$, the cutting mechanism also attached to the lower end of the shaft tube and arranged to be operated by the shaft T, substantially as described.

3. In a mowing machine, the wheeled frame in combination with the intermediate shaft Q arranged to transmit motion from the ground wheels to the cutting mechanism, the shaft tube S, having the cutting mechanism at its lower end and its upper end encircling the shaft Q, and the supports for said shaft tube attached thereto and to the frame: whereby said supports serve the double purpose of sustaining the shaft tube and of supporting the intermediate shaft Q, and the strains and thrusts to which the cutting mechanism is subjected are received by the frame through the shaft tube and its supports, thereby relieving the shaft Q.

4. The combination with the wheeled frame of the cutting mechanism at the side thereof, the connecting member having its lower end connected to the cutting mechanism and its upper end mounted at each side in bearings on the frame, said bearings being independently adjustable.

5. In a mowing machine the combination with the wheeled frame of the shaft Q for transmitting motion from the ground wheels to the cutting mechanism, the shaft tube S having the bearing necks on its upper end, adapted to encircle and turn on the shaft the cutting mechanism at the opposite end of the shaft tube, the collars $k^2$, loosely encircling the bearing necks and the supports for said collars attached to the frame and having adjusting screws adapted to engage the upper and lower sides of the collars, substantially as described.

6. The combination with the main frame, of the cutting mechanism at the side thereof, the shaft tube S, having one end pivotally connected to the cutting mechanism and its other end attached to the frame, and provided on opposite sides with the upper and lower chain guides, the lifting lever fulcrumed on the main frame, and the lifting chain, having one end connected to said lever and extending over the guides and having its opposite end connected to the cutting mechanism, substantially as described.

7. The ground wheels, the frame sustained thereby and movable on a horizontal axis parallel to the axis of the ground wheels, and the cutting mechanism on said frame, in combination with the draft tongue pivoted near its end to said frame in front of the horizontal axis of the latter, the link having one end pivoted to the tongue in rear of the axis of the frame, and its opposite end pivoted to the frame by a movable pivot, and suitable mechanism for varying the relative positions of the frame and the tongue: whereby the said frame may be moved on its axis to raise or lower the points of the knives without changing the position of the forward portion of the tongue, substantially as described.

8. The ground wheels, the frame sustained thereby and revoluble therein on a horizontal axis in line with the axis of the main wheel and having the front and rear timbers and the cutting mechanism sustained by the said frame, in combination with the tongue pivoted near its end to the front beam by a horizontal pivot, the operating lever fulcrumed on said pivots the lever $e^2$ pivoted at its middle to the end of the tongue and having the two arms and the laterally extending pin $i^2$, the rod $d^2$ connected to one arm of the lever and to the operating lever, the bracket $k^3$ on the rear beam, provided with the slot adapted to receive the lateral pin on the arm of the lever substantially as described.

9. In a mowing machine the ground wheels, having the inner bearing ring provided with the lateral flange in combination with the interior ring F having the lateral flange $d'$, the series of antifriction balls, seated between the said rings and the intermediate packing adapted to prevent the contact of the balls, the lateral flanges on either ring constructed to extend across the annular space between the rings substantially as described.

10. The combination with the wheeled frame, of the radial shaft tube having its upper end connected thereto and extending downward and outward therefrom, the longitudinal shaft S journaled in said shaft tube and arranged to be driven by the ground wheels, the pinion $u'$ on the lower end of the said shaft, the transverse shaft T, journaled in the lower end of the shaft tube in position to be driven by the pinion $u'$, the finger bar having the shoe, the cutter bar, the said shoe being sustained by the transverse shaft and the radial shaft tube and movable on an axis in line with the axis of the said shaft, suitable connections between the shaft T and the cutter bar for imparting motion to the latter, and suitable lifting devices for elevating the outer end of the cutter bar, substantially as described..

Signed at Toronto, Ontario, this 29th day of March, A. D. 1888.

FRANK SMITH JACKSON.
    JOHN THOMAS JACKSON.
    THOMAS JACKSON.
    ALFRED JACKSON.

In presence of—
    JOHN BALDWIN HANDS,
    *Barrister, &c., Toronto, Ont.*
    JOHN IRVING POOLE,
    *Student at law, 16 King St., E. Toronto.*